United States Patent [19]

Kaneko et al.

[11] 4,257,066

[45] Mar. 17, 1981

[54] CHANNEL SELECTING APPARATUS FOR USE WITH SIGNAL RECEIVER AND SIGNAL RECORDER

[75] Inventors: Yoshiro Kaneko, Hoya; Masaru Sato, Asaka, both of Japan

[73] Assignee: Sony Corporation, Tokyo, Japan

[21] Appl. No.: 38,857

[22] Filed: May 14, 1979

[30] Foreign Application Priority Data

May 17, 1978 [JP] Japan .............................. 53-64941[U]

[51] Int. Cl.³ .............................................. H04N 5/22
[52] U.S. Cl. ................................. 358/183; 358/191.1
[58] Field of Search ................. 358/183, 191, 139, 142

[56] References Cited

U.S. PATENT DOCUMENTS

| | | | |
|---|---|---|---|
| 4,070,695 | 1/1978 | Scholz et al. | 358/183 |
| 4,139,860 | 2/1979 | Micic et al. | 358/183 |
| 4,157,572 | 6/1979 | Kennedy et al. | 358/183 |

*Primary Examiner*—Richard Murray

*Attorney, Agent, or Firm*—Lewis H. Eslinger; Alvin Sinderbrand

[57] ABSTRACT

A television system having two independently tuneable, simultaneously operating, channels contains a switching means for simultaneously displaying video from the two channels on a cathode ray tube for permitting comparison therebetween and independent comparative tuning thereof. In one embodiment, video from one of the channels is displayed in the top half of the screen and video from the second channel is displayed in the bottom half of the screen. Synchronizing signals from only one of the channels is used throughout the display in order to avoid disruption in synchronization due to switching back and forth between channels. In another embodiment of the invention, video from one of the sources is displayed in the first half of each horizontal line and video from the second source is displayed in the second half of each horizontal line. Thus, side-by-side comparison can be made of displayed video from the two sources.

8 Claims, 8 Drawing Figures

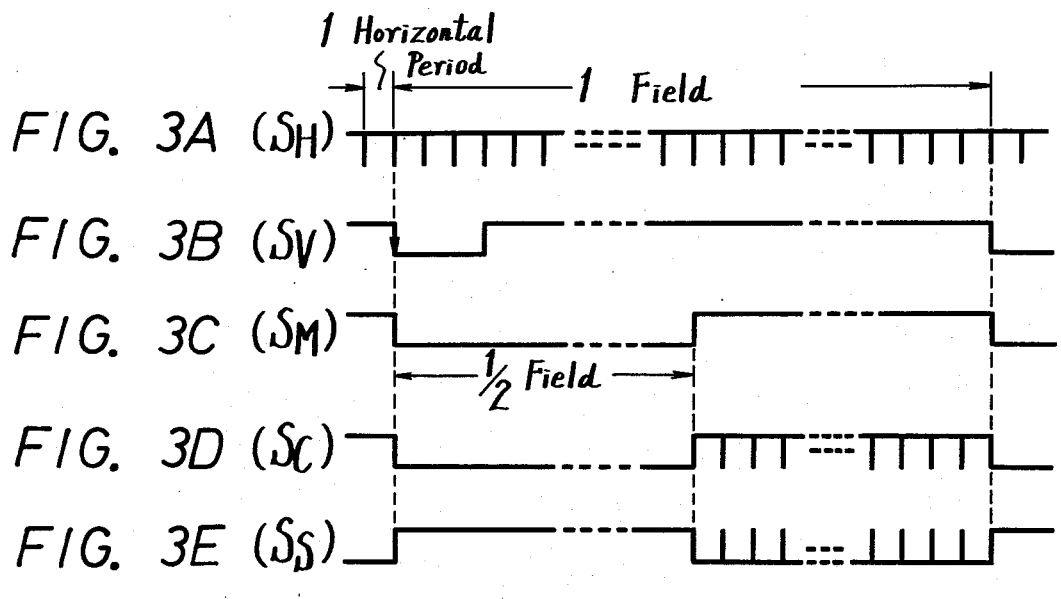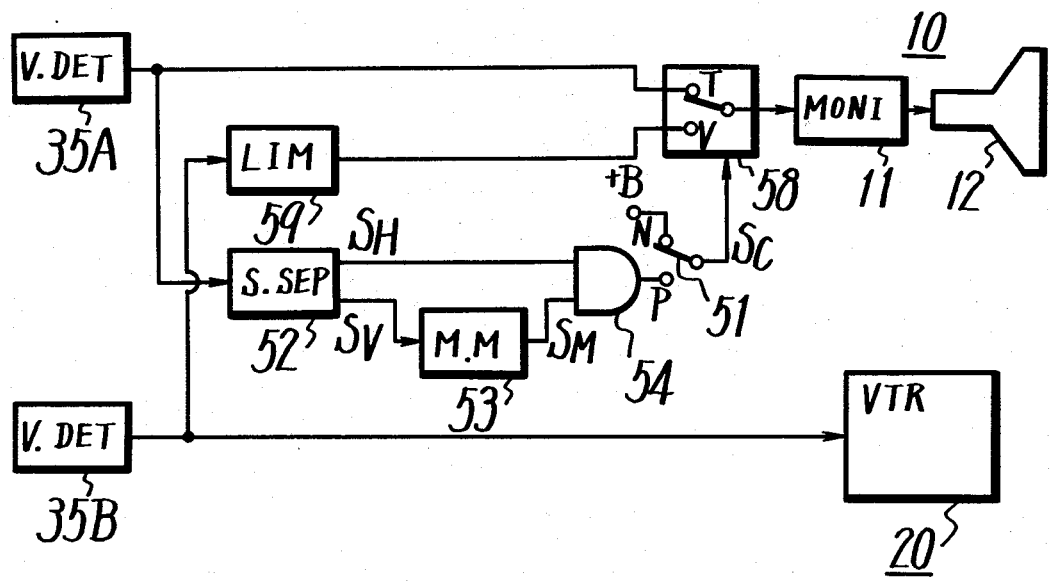

CHANNEL SELECTING APPARATUS FOR USE WITH SIGNAL RECEIVER AND SIGNAL RECORDER

BACKGROUND OF THE INVENTION

The present invention relates to video systems and, more particularly, to video systems having two independently tuneable video channels.

In an apparatus having two independently tuneable video channels such as, for example a television receiver channel and a video tape recorder channel, it is customary to provide for displaying the video signal available to the video tape recorder on the television receiver in order to permit adjustment of the tuning of the signal to the video tape recorder. While the video tape recorder is recording, many equipments permit viewing of television signals on the television receiver from a different channel than the one being recorded. Since the channels are independently tuneable, it is possible to mistune one or both while they are tuned to the same television channel. In order to compare the tuning of the two channels, it has been necessary to switch one and then the other of the tuning channels to the television receiver in order to monitor them. This has been found to be inconvenient.

In addition, when the input to the television receiver is switched from one of the tuning channels to the other, mistuning of the second channel may make the user believe that a malfunction exists in the video system where, in fact, no malfunction exists.

OBJECTS AND SUMMARY OF THE INVENTION

Accordingly, it is an object of the present invention to provide a video system which overcomes the drawbacks of the prior art.

More particularly, it is an object of the present invention to permit simultaneous comparison of video tuned in two independently tuneable channels on a single display.

According to an aspect of the invention, there is provided a video system which comprises first manually adjustable tuning means for tuning a first video signal having video and synchronizing components, second manually adjustable tuning means for tuning a second video signal having video and synchronizing components, display means for displaying at least one of the first and second video signals on a display screen, switch means for selectively applying one of the first video signal and the second video signal to a first area of the display screen in response to a control signal and for applying the other of the first video signal and second video signal to a second area of the display screen in response to the control signal, means for generating the control signal, and means for synchronizing the display means using the synchronizing component only from the first manually adjustable tuning means.

The above, and other objects, features and advantages of the present invention will become apparent from the following description read in conjunction with the accompanying drawings in which like reference numerals designate the same elements.

BRIEF DESCRIPTION OF THE DRAWINGS

FIGS. 3A-3E are waveform diagrams to which reference will be made in explaining the embodiment of the invention shown in FIG. 2; and FIG. 4 is a block diagram of a control circuit according to a second embodiment of the present invention.

DETAILED DESCRIPTION OF THE PREFERRED EMBODIMENTS

Figure 1:
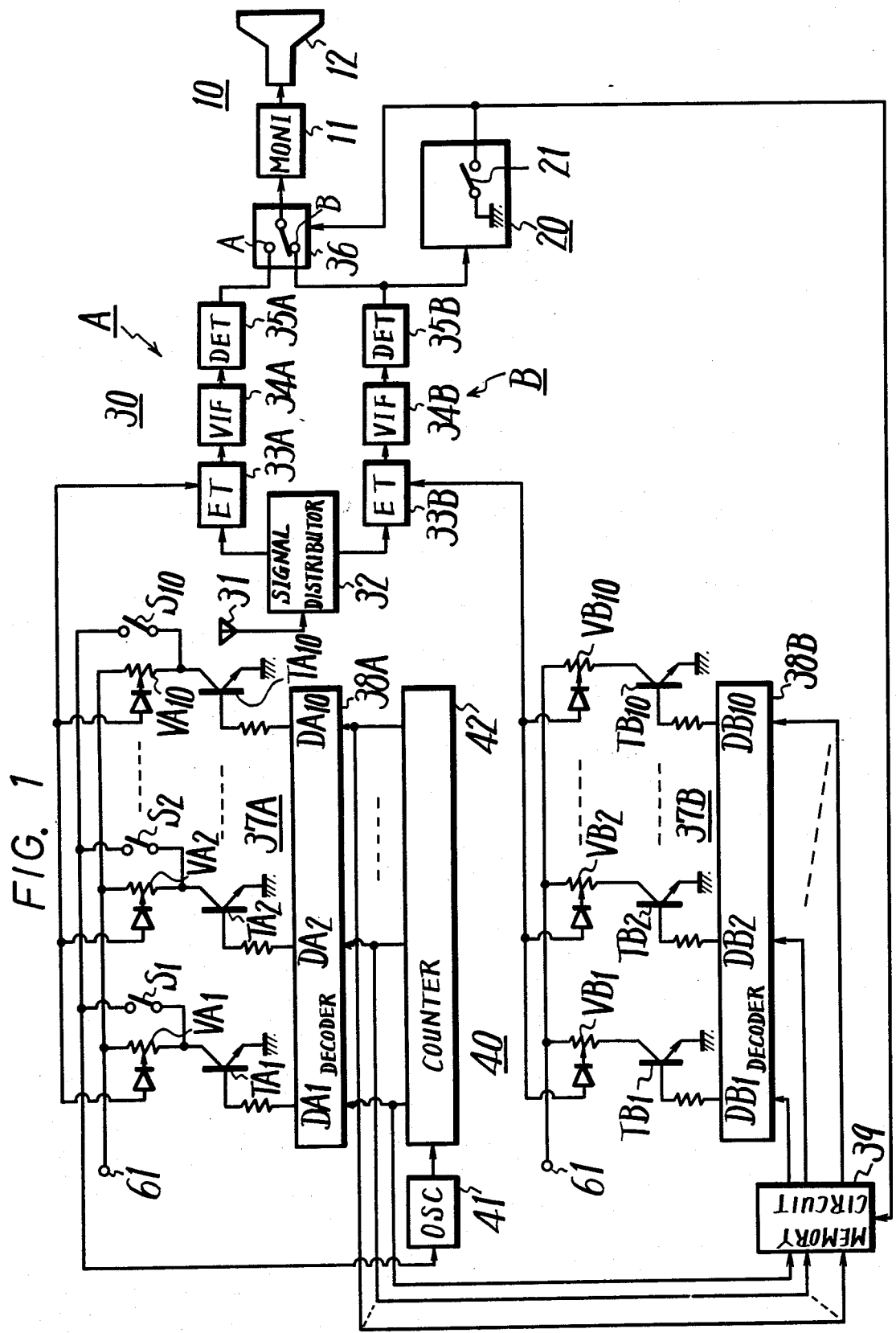
FIG. 1 is a block and schematic diagram of a video system suitable for use with the present invention.

Referring to FIG. 1, there is shown tuning circuitry 30 containing a first tuning channel identified by the letter A and a second tuning channel identified by the letter B. Tuning circuitry 30 may be any suitable signal tuning apparatus such as, for example, as in a television or a video tape recorder. For purposes of description only, and not as a limitation, it is assumed that the items of apparatus identified with the letter A appended to their reference numerals are part of a television receiver 10 and those which are identified with the letter B appended to their reference numerals are part of a video tape recorder 20.

The tuning circuitry for television receiver 10 consists of an electronic tuner 33A, a video intermediate frequency amplifier 34A and a video detector 35A in cascade providing a signal to a terminal A in a changeover switch 36. These elements are of types well known in the art and will not be further described. It is sufficient for purposes of the present invention that electronic tuner 33A contains tuning elements, such as a conventional varactor tuning element (not shown), which is tuneable by an electrical signal applied thereto.

The tuning circuitry for video tape recorder 20 consists of an electronic tuner 33B, a video intermediate frequency amplifier 34B and a video detector 35B which provides an output signal to terminal B of changeover switch 36 and to video tape recorder 20. The tuning circuitry for video tape recorder 20 may be identical to corresponding tuning circuitry for television receiver 10. Although changeover switch 36 is represented as a mechanical switch for ease of description, changeover switch 36 may be an electronic switch using, for example, one or more transistors and/or diodes.

An antenna 31, or other signal source such as a cable, provides television signals to a signal distributor 32. The signal distributor provides output signals to electronic tuners 33A and 33B. Signal distributor 32 may be a conventional signal splitter such as a split transmission line, a resistive pad, or an electronic signal distributor according to designs well known in the art.

Monitor circuits 11 in television receiver 10 process the detected video signal from terminal A or terminal B of changeover switch 36 and apply the video signal to a cathode ray tube 12 to be displayed thereby for monitoring by a user.

The video signal applied by the video detector 35B to video tape recorder 20 may be recorded therein by operation of a record switch 21. Record switch 21 controls recording of the video data in video tape recorder 20 in a conventional fashion not shown in FIG. 1 and also selectively provides an enable signal, namely an open switch contact when record switch 21 is open, and an inhibit signal, namely a closed switch contact connected to ground when record switch 21 is closed.

A channel selecting circuitry 40 includes first and second channel selectors 37A and 37B which provide control signals, preferably voltages having appropriate levels, to electronic tuners 33A and 33B thereby to control the channels to which these electronic tuners are tuned and thus to control the video signals which are displayed on cathode ray tube 12 and/or recorded in video tape recorder 20.

The first or television channel selector 37A consists of a plurality, suitably 10, of selector switches $S_1$-$S_{10}$ connected to the collectors of respective switch transistors $TA_1$-$TA_{10}$. Selector switches $S_1$-$S_{10}$ may conveniently be momentary contact switches which are closeable by the user and which return to the open position when released. Variable resistors $VA_1$-$VA_{10}$ are connected from a voltage source 61 to the junction of the collectors of respective transistors $TA_1$-$TA_{10}$ and switches $S_1$-$S_{10}$. Blocking diodes are connected in parallel from the movable contacts of variable resistors $VA_1$-$VA_{10}$, respectively, to a control line feeding control voltage to electronic tuner 33A.

A clock generator or oscillator 41 is connected in parallel to one terminal of each of normally open selector switches $S_1$-$S_{10}$ to receive energizing potential therefrom when one of selector switches $S_1$-$S_{10}$ is closed. An output of clock generator 41 is applied to an input of a counter 42. Counter 42 may be, for example, a binary counter having a plurality of outputs connected to inputs of a decoder 38A. Decoder 38A decodes its binary inputs and provides an output signal on one and only one of its output terminals $DA_1$-$DA_{10}$ according to the condition of its inputs. For example, upon successive outputs of clock generator 41, and the resulting advancement of a count in counter 42, decoder 38A may provide an output only on output terminal $DA_1$ and, on the next change in the content of counter 42, may provide an output only on output $DA_2$. Successive inputs to counter 42 may successively produce outputs only on output terminals $DA_3$, $DA_4$ and so forth. After an output is generated on output terminal $DA_{10}$, the next output may be on output $DA_1$. Outputs $DA_1$-$DA_{10}$ are applied through resistors to the bases of respective switch transistors $TA_1$-$TA_{10}$. When an output $DA_1$-$DA_{10}$ is applied to a switch transistor $TA_1$--$TA_{10}$, the affected switch transistor is saturated and thus provides a low impedance path between its emitter and collector.

The outputs of counter 42 are also applied through a memory circuit 39 to corresponding inputs of a decoder 38B associated with the second or video tape recorder channel selector 37B. Decoder 38B is preferably the same as decoder 38A. Video tape recorder channel selector 37B employs switch transistors $TB_1$-$TB_{10}$, and variable resistors $VB_1$-$VB_{10}$ are connected between voltage source 61 and the collectors of the respective switch transistors in an arrangement similar to that in television channel selector 37A.

Memory circuit 39 may consist of a plurality of R-S flip-flops, one for each input from counter 42. The R-S flip-flops are enabled or inhibited by the signal from record switch 21 in video tape recorder 20. When the R-S flip-flops are enabled in response to opening of switch 21, their outputs correspond with their inputs. When the R-S flip-flops are inhibited in response to closing of switch 21, whatever output condition exists therein prior to the inhibiting is latched or stored in memory circuit 39 as long as record switch 21 remains closed. Thus, the outputs of memory circuit 39 remain in the latched, or unchanging, condition in which they continue to apply the same input signals to decoder 38B regardless of further changes in the inputs to memory circuit 39.

Variable resistors $VA_1$-$VA_{10}$ and $VB_1$-$VB_{10}$ are manually adjustable to provide tuning signals at their wipers or movable contacts which can conveniently control their respective electronic tuners 33A, 33B to tune any selected one of the available television channels such as, for example, VHF television channels 2-13 and/or UHF television channels. Variable resistor $VA_1$, for example, may be adjusted to provide a control voltage to electronic tuner 33A suitable to tune television channel 2 whereas variable resistor $VA_2$ may be adjusted to provide a tuning voltage suitable for tuning television channel 4, etc. It is desirable that corresponding ones of variable resistors $VB_1$-$VB_{10}$ in video tape recorder channel selector 37B be adjusted to tune the same television channels as their counterparts in television channel selector 37A. For example, if variable resistor $VA_1$ in television channel selector 37A is adjusted to tune television channel 2, variable resistor $VB_1$ in video tape recorder channel selector 37B should also be adjusted to tune television channel 2. The provision for individual adjustment of corresponding variable resistors in the two channel selectors accommodates the fact that electronic tuners 33A and 33B may respond slightly differently to control voltages. Thus individual control is provided to correctly adjust both electronic tuners 33A, 33B.

Clock generator 41 is normally quiescent since it receives its energizing signal from voltage source 61 only through one of variable resistors $VA_1$-$VA_{10}$ and a closed one of selector switches $S_1$-$S_{10}$. Normally, all of selector switches $S_1$-$S_{10}$ are in the opened position shown. Thus, clock generator 41 remains unenergized. As previously noted, decoder 38A provides an output on a single one of its output terminals $DA_1$-$DA_{10}$ corresponding to a particular set of outputs of counter 42. For example, assuming that the outputs of counter 42 are in the condition to produce an output on output terminal $DA_1$ of decoder 38A, this signal, applied to the base of switch transistor $TA_1$, saturates transistor $TA_1$ and effectively grounds the lower end of variable resistor $VA_1$. The voltage thus available at the movable contact of variable resistor $VA_1$ is applied to electronic tuner 33A which is thus controlled to tune, for example, television channel 2.

The outputs of counter 42 are also applied to the inputs of memory circuit 39. If record switch 21 is in the opened condition shown, the outputs of memory circuit 39 correspond to its inputs. These outputs are applied to the inputs of decoder 38B. Under the conditions described above, decoder 38B provides an output signal on output $DB_1$ which is applied to the base of switch transistor $TB_1$. Transistor $TB_1$ is saturated and grounds the lower end of variable resistor $VB_1$ to provide a control signal from the movable contact of variable resistor $VB_1$ to an input of electronic tuner 33B. Variable resistor $VB_1$ is preferably adjusted to tune the same channel as tuned by variable resistor $VA_1$. Although video detectors 35A and 35B both provide video signals to changeover switch 36, only the video signal from detector 35B is applied through monitor circuits 11 to cathode ray tube 12. The video signal from video detector 35A is not used in the condition shown.

When it is desired to change the channel, a selector switch, for example, selector switch $S_2$, is closed. This applies a voltage from voltage source 61 through variable resistor $VA_2$ and the closed contacts of selector switch $S_2$ to an input of clock generator 41. Clock generator 41 begins producing an output signal which advances the count in counter 42. As the count in counter 42 is advanced, decoder 38A de-energizes its output terminal $DA_1$ and energizes its output terminal $DA_2$. Thus, the tuning voltage previously available to electronic tuner 33A from the movable terminal of variable resistor $VA_1$ is removed and is replaced by the voltage available at the movable contact of variable resistor $VA_2$. In addition, since switch transistor $TA_2$ is saturated, the energizing voltage previously available to clock generator 41 through switch $S_2$ is shunted to ground through the collector-emitter path of switch transistor $TA_2$. Consequently, clock generator 41 ceases producing output signals and television channel selector 37A remains in the condition selected by selector switch $S_2$. Similarly, the output $DB_1$ of decoder 38B is removed and a new output on output terminal $DB_2$ is produced to thus provide a tuning signal from variable resistor $VB_2$ to electronic tuner 33B. If selector switch $S_2$ is again operated, no change takes place because switch transistor $TA_2$, in connecting the lower end of variable resistor $VA_2$ to ground, prevents an energizing signal being transmitted through switch $S_2$ to clock generator 41.

If a different selector switch, for example, switch $S_1$, is operated, the output $DA_2$ is removed and outputs $DA_3$, $DA_4$–$DA_{10}$ are produced in sequence until the output $DA_1$ is again produced. When an output on output terminal $DA_1$ again appears, outputs from clock generator 41 and counting in counter 42 are stopped. Thus, in the manner previously described, control voltages from variable resistors $VA_1$ and $VB_1$ are applied to their respective electronic tuners 33A and 33B.

It would be clear to one skilled in the art that the outputs $DA_1$–$DA_{10}$ of decoder 38A may be applied directly to memory circuit 39 instead of the outputs of counter 42. In this case, decoder 38B can be omitted and the outputs of memory circuit 39 can be connected directly to the base resistors of switch transistors $TB_1$–$TB_{10}$.

It will be noted in the preceding that the signal being displayed on cathode ray tube 12 is the signal from video detector 35B that is available to video tape recorder 20. Thus, the viewer is able to adjust the appropriate variable resistor $VB_1$–$VB_{10}$ for the received channel to ensure that, when recording is begun, proper tuning is completed.

When record switch 21 is closed, recording of the previously selected channel begins in video tape recorder 20. In addition, the latch or inhibit signal from record switch 21 applied to memory circuit 39 inhibits all R-S flip-flops therein and prevents further changes in the outputs of memory circuit 39 applied to decoder 38B thus latching or storing the values then existing at the input of memory circuit 39. At the same time, the latch signal from record switch 21 changes over changeover switch 36 from terminal B to terminal A. In this condition, the output of video detector 35A is applied through monitor circuits 11 to cathode ray tube 12. As previously explained, corresponding variable resistors $VA_1$–$VA_{10}$ and $VB_1$–$VB_{10}$ are adjusted to tune the same television channels. Consequently, when record switch 21 is closed, the signal being tuned in electronic tuner 33A should be the same as that being tuned in electronic tuner 33B. Consequently, if both channels are accurately adjusted when record switch 21 is closed, the viewer should notice no difference in the displayed picture. If necessary, the viewer can adjust the appropriate one of variable resistors $VA_1$–$VA_{10}$ to correctly tune the television channel.

While recording is being performed in video tape recorder 20, the viewer may operate one of selector switches $S_1$–$S_{10}$ to change the channel being displayed on cathode ray tube 12. For example, if selector switch $S_{10}$ is operated, energizing voltage from voltage source 61 is applied through variable resistor $VA_{10}$ and the closed contacts of switch $S_{10}$ to clock generator 41. Counter 42 and decoder 38A function as previously described to commutate the outputs $DA_1$–$DA_{10}$ until an output signal is provided at output $DA_{10}$. In the manner previously described, clock generator 41, counter 42 and decoder 38A are stopped at that point and a control voltage is applied from the movable contact or wiper of variable resistor $VA_{10}$ to electronic tuner 33A. No change takes place in decoder 38B due to the inhibited condition of memory circuit 39. Thus, one television channel can be recorded in video tape recorder 20 while the viewer tunes other television channels using selector switches $S_1$–$S_{10}$.

If the viewer opens record switch 21, memory circuit 39 becomes enabled and thus changes its output signals to correspond to its inputs. At the same time, changeover switch 36 changes over from its terminal A to terminal B thus disconnecting video detector 35A from monitor circuits 11, and again applying the video signal from video detector 35B to monitor circuits 11. However, since memory circuit 39 now permits its outputs to correspond to the actual count supplied by counter 42, video tape recorder channel selector 37B selects the same television channel selected by television channel selector 37A, and the viewer should notice little or no change on cathode ray tube 12 as a result of the changeover.

It will be noted that, as the user switches into and out of the recording mode, the signal being displayed on cathode ray tube 12 changes from the signal tuned by electronic tuner 33B under control of one of variable resistors $VB_1$–$VB_{10}$ to the signal tuned by electronic tuner 33A under the control of variable resistor $VA_1$–$VA_{10}$. In order to properly adjust both variable resistors associated with a given channel, it is necessary for the user of the apparatus in FIG. 1 to switch into and out of the recording mode using record switch 21. It may also happen that, when entering the recording mode, the active one of variable resistors $VA_1$–$VA_{10}$ may be improperly adjusted. When this occurs, an improperly tuned picture may be displayed for which the user may misunderstand the cause and may believe that a malfunction exists in his equipment when the problem is merely improper tuning.

Figure 2:
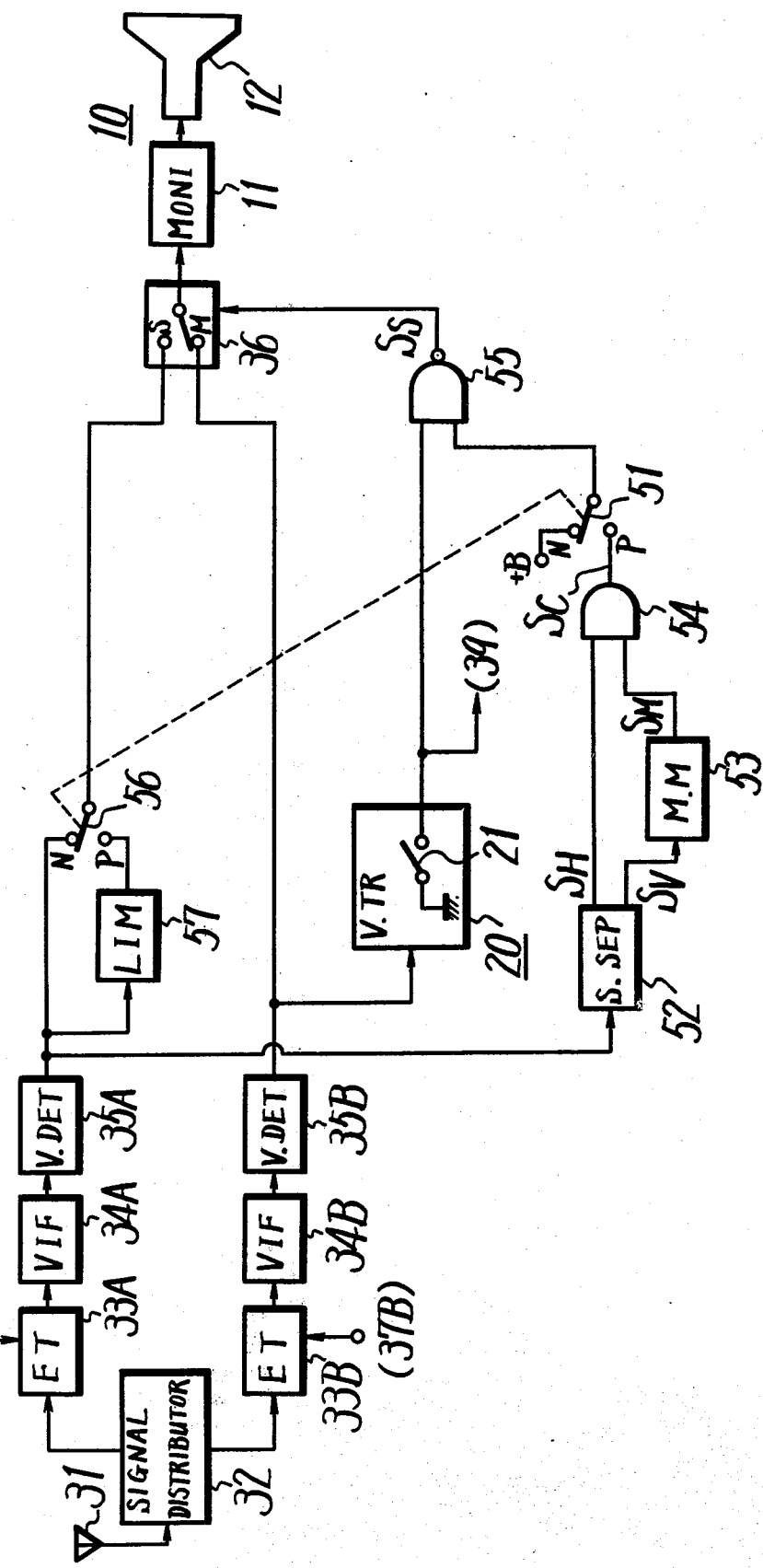
FIG. 2 is a block diagram of part of the system shown on FIG. 1 including a control circuit according to one embodiment of the present invention.

In order to avoid the inconvenience noted in the preceding paragraph, and to permit direct comparison of the tuning in the two tuning channels A and B, an embodiment of the invention shown in FIG. 2 provides means for presetting the pairs of corresponding variable resistors associated with the two tuning channels A and B aided by a simultaneous display of video signals from both tuning channels. For simplification of the drawing, FIG. 2 omits channel selecting circuitry 40 and merely indicates the source or destination of signals associated with channel selecting circuitry 40.

As before, the output of antenna 31, split into two equal signals by signal distributor 32, is processed in parallel channels by an electronic tuner 33A, video intermediate frequency amplifier 34A and video detector 35A as well as by electronic tuner 33B, video intermediate frequency amplifier 34B and video detector 35B. Channel tuning is performed by control signals from television channel selector 37A applied to electronic tuner 33A and from video tape recorder channel selector 37B applied to electronic tuner 33B. The output of video detector 35A is applied to an input of a synchronizing signal separating circuit 52 which applies a horizontal synchronizing signal $S_H$ (FIG. 3A) to one input of an AND gate 54, and a vertical synchronizing signal $S_V$ (FIG. 3B) to an input of a monostable multivibrator 53. Monostable multivibrator 53 has a period equal to one half a field period (120th of a second). When triggered by the negative-going leading edge of the vertical synchronizing signal $S_V$ indicated by a downward pointing arrow (FIG. 3B), monostable multivibrator 53 produces an output signal $S_M$ (FIG. 3C) which consists of a negative or low signal portion of a period equal to one half a field and then resumes its positive or high condition until again retriggered. The signal $S_M$ is applied to the second input of AND gate 54. The output $S_C$ of AND gate 54 (FIG. 3D) is applied to a preset terminal P of a preset switch 51. A normal terminal N of preset switch 51 receives a positive voltage +B. The output of preset switch 51 is applied to one input of a NAND gate 55, and a second input of NAND gate 55 receives the latch output of record switch 21. As is well known, when record switch 21 is in the opened condition shown, it has the effect of enabling one input of NAND gate 55. Thus, whatever signal is available at the second input of NAND gate 55 is inverted in NAND gate 55 and produces an inverted output signal $S_S$ (FIG. 3E) which is applied to changeover switch 36.

The output of video detector 35A is also connected directly to a normal terminal N of a preset switch 56 and to an input of a limiter 57. Limiter 57 removes the synchronizing signals from the video from video detector 35A and applies the remaining video signal to a preset terminal P of preset switch 56. The movable contacts of preset switches 51 and 56 are ganged for concerted movement thereof between their normal N and their preset P fixed terminals. When preset switches 51 and 56 are connected to their normal N terminals, the function of the apparatus in FIG. 2 is identical to the function of the apparatus previously described with reference to FIG. 1.

When preset switches 51 and 56 are moved to their preset P terminals, changeover switch 36 is controlled by signal $S_S$ so that video and synchronizing signals are applied from video detector 35B to monitor circuits 11 and cathode ray tube 12 during the first half of each field and video signals, from which the synchronizing signals have been removed, are applied from detector 35A and limiter 57 to monitor circuits 11 during the second half of each field. In order to provide synchronizing signals to monitor circuits 11 during the second half of each field, changeover switch 36 is further controlled by signal $S_S$ to be in contact with its terminal S during the video portion and in contact with its terminal M during the horizontal synchronizing portion of each line in the second half of each field. Thus, during the first half of each field, both video and synchronizing signals are derived from video detector 35B. During the second half of each field, the video to be displayed on cathode ray tube 12, and from which the synchronizing signals have been removed by limiter 57, is derived from video detector 35A, but the horizontal synchronizing signals continue to be derived from video detector 35B. This avoids the lack of synchronization which could occur if synchronizing signals are derived from separate tuning, amplifying and detecting circuits.

As will be evident from the preceding, when preset switches 51 and 56 are in the preset condition, the picture displayed on cathode ray tube 12 includes a portion on the upper half screen containing video from video detector 35B adjacent to a portion on the lower half screen containing video from video detector 35A. Thus, direct comparison of the video in the two channels can be made to ensure that the same channel is being tuned by the active ones of variable resistors $VA_1$–$VA_{10}$ and $VB_1$–$VB_{10}$ and to permit accurate comparative tuning of both active variable resistors to optimize the displayed signals.

Referring now to FIG. 4, there is shown an embodiment of the invention in which one tuner is used for feeding a signal to a television receiver independently of a second tuner which is used for feeding a signal to a video tape recorder. Video detector 35A applies the signal tuned by electronic tuner 33A (not shown in FIG. 4) to a terminal T of a switching circuit 58. The output of video detector 35A is also connected to an input of synchronizing signal separating circuit 52 which, in turn, produces a horizontal synchronizing signal $S_H$ and a vertical synchronizing signal $S_V$. Horizontal synchronizing signal $S_H$ is applied to one terminal of AND gate 54. Vertical synchronizing signal $S_V$ is applied to an input of monostable multivibrator 53 which, as previously described, produces an output signal $S_M$ (FIG. 3C) which is applied to the second input of AND gate 54.

An output of video detector 35B, which is tuned by electronic tuner 33B (not shown in FIG. 4) is connected directly to video tape recorder 20 and to a limiter 59. Limiter 59 removes the synchronizing signals from the video signal from video detector 35B and applies the resulting video signal to terminal V of switching circuit 58.

The output of AND gate 54 is applied to a preset terminal P of preset switch 51. A positive voltage +B is applied to the normal terminal N of preset switch 51. The movable terminal of preset switch 51 is connected to switching circuit 58.

When preset switch 51 is in its normal condition with its movable terminal in contact with normal terminal N, switching circuit 58 is in the condition shown in which the signal from video detector 35A is applied through terminal T of switching circuit and monitor circuits 11 to cathode ray tube 12. The output of video detector 35B is always connected directly to video tape recorder 20.

When it is desired to compare the tuning condition of signals in the television receiver 10 and video tape recorder 20 channels, preset switch 51 is moved into contact with its preset terminal P. Control signal $S_C$ (FIG. 3D) at the output of AND gate 54 controls switching circuit 58 in a manner which is substantially the inverse of that previously described for changeover switch 36 in FIGS. 1 and 2. More particularly, the output of video detector 35A is applied directly through switching circuit 58 and monitor circuits 11 to cathode ray tube 12 during the first half of each field, and the video from video detector 35B, with its synchronizing signals removed by limiter 59, is applied through switching circuit 58 and monitor circuits 11 to cathode ray tube 12 during the second half of each field. In the second half of each field, signal $S_C$ momentarily changes over the moving contact of switching circuit 58 from terminal V to terminal T in order to employ the horizontal synchronizing signal from video detector 35A throughout each field.

In the previous embodiments, the top-half and bottom-half division of a displayed television picture between the video from video detectors 35A and 35B may be changed to a side-by-side division by employing a monostable multivibrator similar to monostable multivibrator 53 but triggered by horizontal synchronizing signal $S_H$ to control switching circuit 36 or 58 to provide video from one of the sources during the first half of each horizontal line and from the other of the sources during the second half of each horizontal line. Since horizontal synchronization can be performed in this embodiment with the output of one of the video detectors 35A or 35B, limiter 57 or 59 is not required. In addition, monostable multivibrator 53, triggered by vertical synchronizing signals $S_V$ is also not required.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims. For example, although the preceding description has used a system having a television receiver and a video tape recorder, it is equally applicable to a system having two video tape recorder channels.

What is claimed is:

1. A video apparatus comprising first and second tuning means for tuning first and second video signals, respectively, said first and second video signals each conveying visual information and synchronizing information including horizontal sync pulses, and said video signals each including a plurality of video fields each of which includes a plurality of horizontal line intervals each having a picture portion in which said visual information is conveyed; display means having a display screen and deriving visual information and synchronizing information, including said horizontal sync pulses, from at least one of said first and second video signals for displaying visual information on said screen; switch means having a control input receiving a control signal for selectively applying one of said first and second video signals to said display means in response to first and second states, respectively, of said control input and for selectively controlling, in response to said states of said control inputs, from which of said first and second video signals said display means derives its visual and synchronizing information, including its horizontal sync pulses; and means for generating said control signal including split image generating means having means for generating said first state of said control signal during the displaying of visual information on a first area of said screen so that said first video signal is applied to said first area, and means for generating said second state of said control signal during the displaying of visual information on a second area of said screen and during the horizontal sync pulses of said second video signal so that said second video signal is applied to said second area and, during the displaying of visual information on said first and second areas, the synchronizing information of said display means is derived from said second video signal.

2. A video apparatus according to claim 1; wherein said means for generating said first state of said control signal includes means for generating said first state during substantially all of the picture portion of a first plurality of successive horizontal line intervals of said second video signal, and said means for generating said second state of said control signal includes means for generating said second state during substantially all of the picture portion of a second, and different, plurality of successive horizontal line intervals of said second video signal as well as during the horizontal sync pulses of said second video signal in both said first and second plurality of horizontal line intervals.

3. A video apparatus according to claim 1; wherein said means for generating said first and second states of said control signal include means for alternately generating said first and second states during the picture portion of each of a plurality of successive horizontal line intervals of said second video signal and for generating said second state during the horizontal snyc pulses of said plurality of horizontal line intervals.

4. A video apparatus according to claim 1; further comprising means for eliminating said horizontal sync pulses from said first video signal before it is supplied to said switch means.

5. A video apparatus according to claim 1; wherein said means for generating said control signal further includes means for deactivating said split image generating means, and means for selectively generating either said first or second state of said control signal continuously throughout a plurality of successive video fields.

6. A video apparatus according to claim 1; wherein said display means includes a television receiver; and further comprising a video recorder for recording one of said first and second video signals.

7. A video apparatus according to claim 1; further comprising channel selecting means common to said first and second tuning means for tuning said first and second tuning means to the same video channel.

8. A video apparatus according to claim 7; wherein said first and second tuning means each have separate fine tuning controls for independently adjusting the fine tuning of each of said first and second tuning means.

* * * * *